(12) United States Patent
Weis et al.

(10) Patent No.: US 11,038,893 B2
(45) Date of Patent: Jun. 15, 2021

(54) VALIDATING A DEVICE CLASS CLAIM USING MACHINE LEARNING

(71) Applicant: Cisco Technology, Inc., San Jose, CA (US)

(72) Inventors: Brian E. Weis, San Jose, CA (US); Blake Harrell Anderson, San Jose, CA (US); Rashmikant B. Shah, San Jose, CA (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 15/595,016

(22) Filed: May 15, 2017

(65) Prior Publication Data
US 2018/0332053 A1 Nov. 15, 2018

(51) Int. Cl.
*H04L 29/06* (2006.01)
*G06N 20/00* (2019.01)

(52) U.S. Cl.
CPC .......... *H04L 63/104* (2013.01); *G06N 20/00* (2019.01); *H04L 63/20* (2013.01)

(58) Field of Classification Search
None
See application file for complete search history.

(56) References Cited

U.S. PATENT DOCUMENTS

| | | | |
|---|---|---|---|
| 9,450,972 B2 | 9/2016 | Cruz Mota et al. | |
| 9,563,854 B2 | 2/2017 | Cruz Mota et al. | |
| 9,743,297 B1* | 8/2017 | Jackson | H04B 17/3912 |
| 10,135,790 B2* | 11/2018 | Lapidous | H04L 63/0272 |
| 2015/0134954 A1 | 5/2015 | Walley et al. | |
| 2016/0028753 A1 | 1/2016 | Di Pietro et al. | |
| 2016/0234232 A1* | 8/2016 | Poder | H04L 63/1408 |
| 2016/0261465 A1* | 9/2016 | Gupta | H04W 12/121 |
| 2017/0126718 A1* | 5/2017 | Baradaran | H04L 63/0281 |
| 2017/0149937 A1* | 5/2017 | Ren | H04W 4/70 |
| 2018/0102901 A1* | 4/2018 | Linton | H04L 9/3236 |
| 2018/0115574 A1* | 4/2018 | Ridley | H04L 43/106 |
| 2018/0144139 A1* | 5/2018 | Cheng | G06F 21/577 |

(Continued)

FOREIGN PATENT DOCUMENTS

WO WO-2017003666 A1 1/2017

OTHER PUBLICATIONS

Lear et al., "Manufacturer Usage Description Specification", Network Working Group Internet-Draft, <draft-ietf-opsawg-mud-03>, Jan. 5, 2017, 39 pages, Internet Engineering Task Force Trust.

*Primary Examiner* — Natisha D Cox
(74) *Attorney, Agent, or Firm* — Behmke Innovation Group LLC; Kenneth J. Heywood; James J. Wong

(57) ABSTRACT

In one embodiment, a device in a network receives an access policy and a class behavioral model for a node in the network that are associated with a class asserted by the node. The device applies the access policy and class behavioral model to traffic associated with the node. The device identifies a deviation in a behavior of the node from the class behavioral model, based on the application of the class behavioral model to the traffic associated with the node. The device causes performance of a mitigation action in the network based on the identified deviation in the behavior of the node from the class behavioral model.

18 Claims, 6 Drawing Sheets

(56) References Cited

U.S. PATENT DOCUMENTS

2018/0181871 A1* 6/2018 Chae .................... G06F 21/552
2018/0189667 A1* 7/2018 Tsou .................... G06N 20/20
2019/0213446 A1* 7/2019 Tsou .................... H04W 4/70

* cited by examiner

VALIDATING A DEVICE CLASS CLAIM USING MACHINE LEARNING

TECHNICAL FIELD

The present disclosure relates generally to computer networks, and, more particularly, to validating a device class claim using machine learning.

BACKGROUND

An emerging area of interest in the field of computer networking is the "Internet of Things" (IoT), which may be used by those in the art to refer to uniquely identifiable objects/things and their virtual representations in a network-based architecture. In particular, the IoT involves the ability to connect more than just computers and communications devices, but rather the ability to connect "objects" in general, such as lights, appliances, vehicles, window shades and blinds, doors, locks, etc. In contrast to traditional computing devices such as laptops, mobile phones, etc., many IoT devices have very limited resources and capabilities in terms of processing power, memory, power (e.g., battery-powered IoT devices), and the like. Further, communications in an IoT network are also typically constrained and may rely on a lossy, shared-media network that is highly susceptible to changing environmental conditions (e.g., a shut door, weather, etc.).

In many IoT deployments, the various types of IoT devices do not authenticate themselves to the network. In part, this may be due to their lack of ability to use a strong authentication mechanism, such as IEEE 802.1X. As a result, many IoT networks are unable to distinguish between the different classes of IoT devices present in the network and tailor the network policies to the specific device classes. Even in cases in which an IoT device asserts a claim of a particular device class to the network, a malicious entity could potentially claim a different device class/type to gain additional network privileges.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
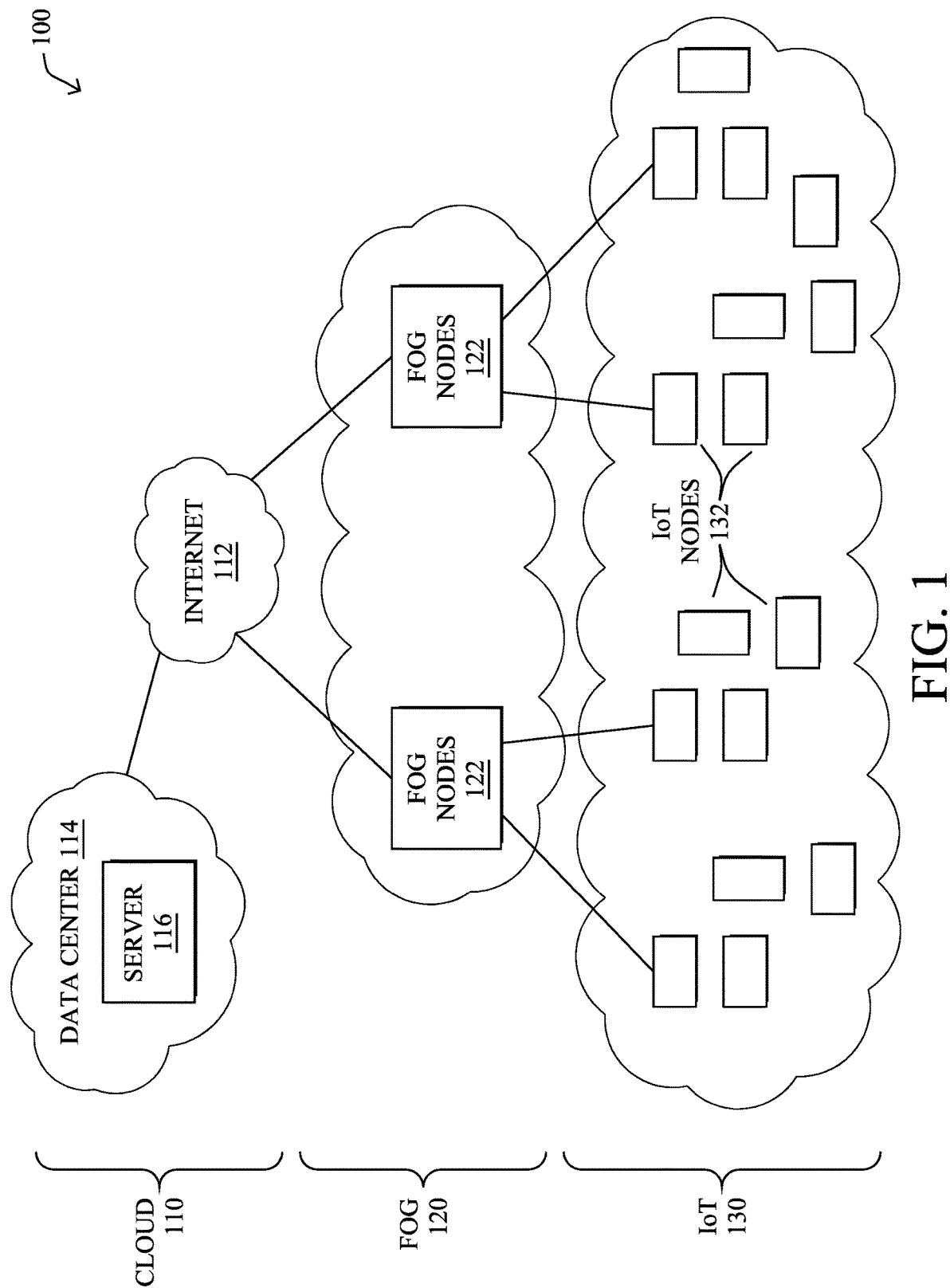
FIG. 1 illustrates an example communication network.

According to one or more embodiments of the disclosure, a device in a network receives an access policy and a class behavioral model for a node in the network that are associated with a class asserted by the node. The device applies the access policy and class behavioral model to traffic associated with the node. The device identifies a deviation in a behavior of the node from the class behavioral model, based on the application of the class behavioral model to the traffic associated with the node. The device causes performance of a mitigation action in the network based on the identified deviation in the behavior of the node from the class behavioral model.

In further embodiments, a supervisory device in a network receives data indicative of a class asserted by a node in the network. The supervisory device identifies an access policy associated with the class asserted by the node. The supervisory device identifies a class behavioral model associated with the class asserted by the node. The supervisory device causes installation of the access policy and class behavioral model to one or more networking devices in the network. The one or more networking devices apply the access policy and behavioral model to traffic associated with the node. The one or more networking devices further cause a mitigation action to be performed when a behavior of the node deviates from the class behavioral model.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes can be arranged in a hierarchy of levels, where lower level fog nodes are closer to the IoT things, and higher level fog nodes are closer to the cloud. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
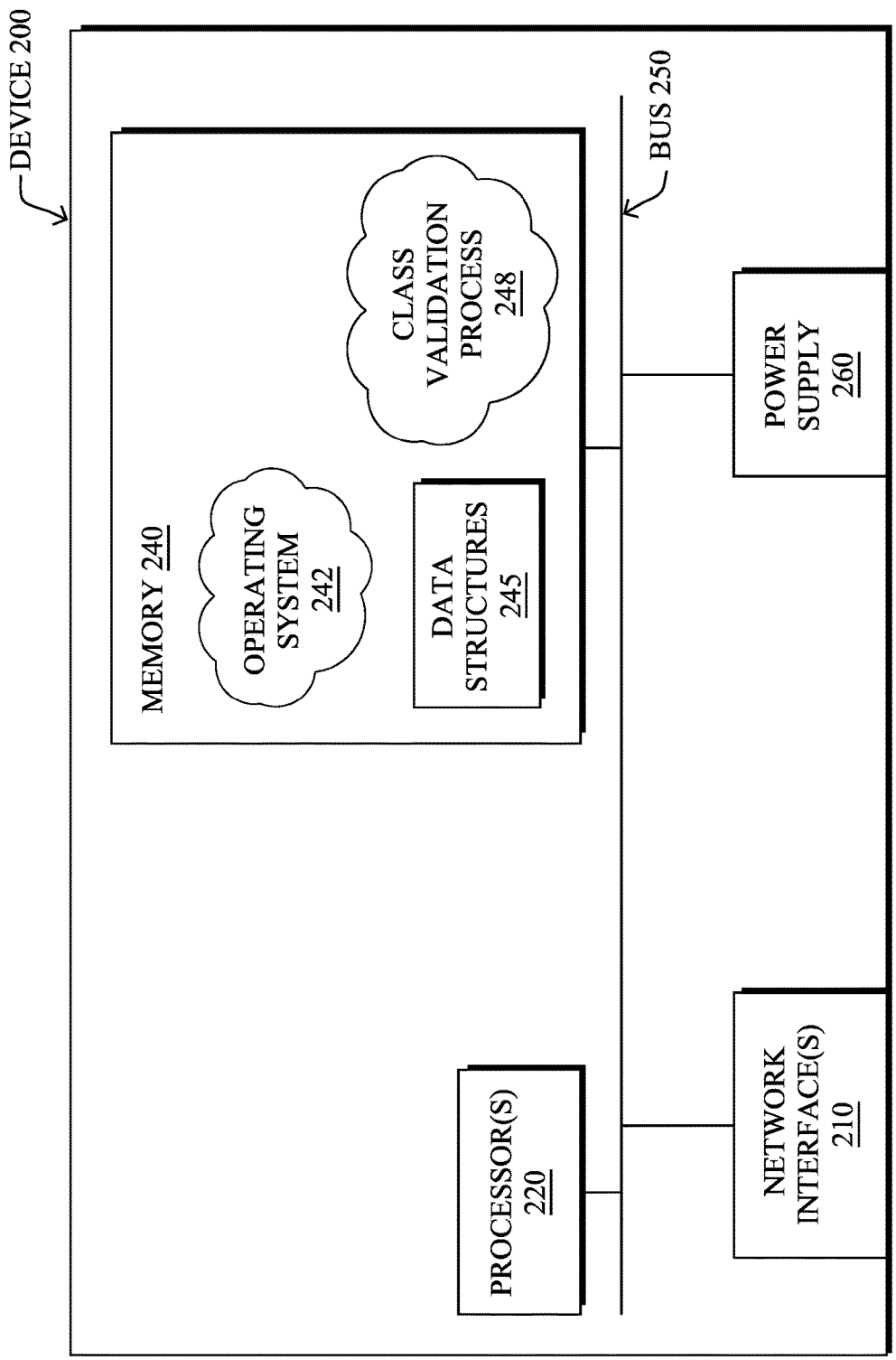
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for devices using PLC, the network interface 210 may communicate through the power supply 260, or may be an integral component of the power supply. In some specific configurations the PLC or Power over Ethernet (PoE) signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative class validation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As described in greater detail below, class validation process 248 generally includes computer executable instructions that, when executed by processor(s) 220, cause device 200 to operate as part of an infrastructure within a network to validate a class/type asserted by a node in the network and to apply appropriate network security access policies to the node. According to various embodiments, class validation process 248 may employ any number of machine learning techniques, to assess whether the node is indeed part of the class asserted by the node. In general, machine learning is concerned with the design and the development of techniques that receive empirical data as input (e.g., data associated with a given node/device in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, process 248 can use the model M to classify new data points, such as traffic data from the node, to determine whether the observed traffic behavior is 'expected/normal' or 'unexpected/abnormal.' Often, M is a statistical model, and the cost function is inversely proportional to the likelihood of M, given the input data.

In various embodiments, class validation process 248 may employ one or more supervised, unsupervised, or semi-supervised machine learning models to analyze traffic associated with a class/type of node/device, to model its behavior in the network. Generally, supervised learning entails the use of a training dataset, which is used to train the model to apply labels to the input data. For example, the training data may include sample traffic data observed from one or more nodes of the class that can be labeled as expected/normal and sample traffic data that can be labeled as unexpected/abnormal. On the other end of the spectrum are unsupervised techniques that do not require a training set of labels. Notably, while a supervised learning model may look for previously seen traffic data that has been labeled accordingly, an unsupervised model may instead detect shifts in behavior based on a model of previously observed behavior. Semi-supervised learning models take a middle ground approach that uses a greatly reduced set of labeled training data.

Example machine learning techniques that class validation process 248 can employ may include, but are not limited to, nearest neighbor techniques (e.g., k-nearest neighbor models, replicator nearest neighbor models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, other forms of machine learning-based classification, or the like.

As noted above, in many IoT deployments, the IoT nodes/devices do not authenticate themselves to the network using a strong authentication method, such as IEEE 802.1X, thus presenting certain challenges from a security perspective. In particular, knowing the class/device type of a particular IoT node may be of use with respect to applying network access policies that are customized for the class of nodes to which the particular node belongs. For example, consider the case of a certain class of surveillance cameras deployed in the network. Such a camera may need to send video traffic to one or more destinations in the fog or cloud for further processing, may need to download firmware updates from a remote service, and may need to receive control commands from a controller (e.g., to adjust the pan, tilt, or zoom of the camera). In contrast, a deployed temperature sensor may need to communicate with a completely different set of endpoints than that of the security camera. Allowing the IoT nodes to simply communicate with any endpoint without restriction would lead to the potential of a compromised node in the network being able to take malicious actions such as exfiltrating data, spreading malware, launching a network attack, or the like.

In some embodiments, a node may assert its device class to the network, either explicitly or implicitly, thus allowing the network to impose a class-specific access control policy to the node. For example, Manufacturer Usage Description (MUD) is an example approach that is currently being standardized. Generally, when MUD is used, the IoT node emits a claim of a device class in the form of a universal resource identifier (URI), which can be resolved by the network to learn the identity of the node, as well as some manufacturer-derived policies associated with the device class.

Validating a Device Class Claim Using Machine Learning

The techniques herein introduce mechanisms to first identify, either explicitly or implicitly, a device class of a node attaching to a network. A pre-computed, machine learning-based behavioral model for that device class can then be installed on one or more networking devices (e.g., switches, routers, gateways, firewalls, etc.) in the network, to monitor the traffic of the node and determine whether the node is genuinely a member of the device class. Notably, if the node does not behave in accordance with the expected behavior of a node of that type/class, the networking device(s) may cause a mitigation action to be performed, such as blocking traffic associated with the node, generating an alert (e.g., to a user interface of a network administrator), or the like.

Specifically, according to one or more embodiments of the disclosure as described in detail below, a device in a network receives an access policy and a class behavioral model for a node in the network that are associated with a class asserted by the node. The device applies the access policy and class behavioral model to traffic associated with the node. The device identifies a deviation in a behavior of the node from the class behavioral model, based on the application of the class behavioral model to the traffic associated with the node. The device causes performance of a mitigation action in the network based on the identified deviation in the behavior of the node from the class behavioral model.

Illustratively, the techniques described herein may be performed by hardware, software, and/or firmware, such as in accordance with the class validation process 248, which may include computer executable instructions executed by the processor 220 (or independent processor of interfaces 210) to perform functions relating to the techniques described herein.

Operationally, the techniques herein can be used in any network implementation in which a node/device emits a claim of a device class to which the node belongs. For example, an IoT node may claim to be an "Acme Luminaire Manufacturer Model 10." This class identification is used with an analytics-based approach to evaluate whether the node is behaving as a legitimate node of that device type. For example, the network may monitor the traffic of the node, to see whether the node is exchanging packets with an Acme Luminaire lighting server and, if so, whether the packets have the characteristics of a normal management flow between them.

Figure 3:
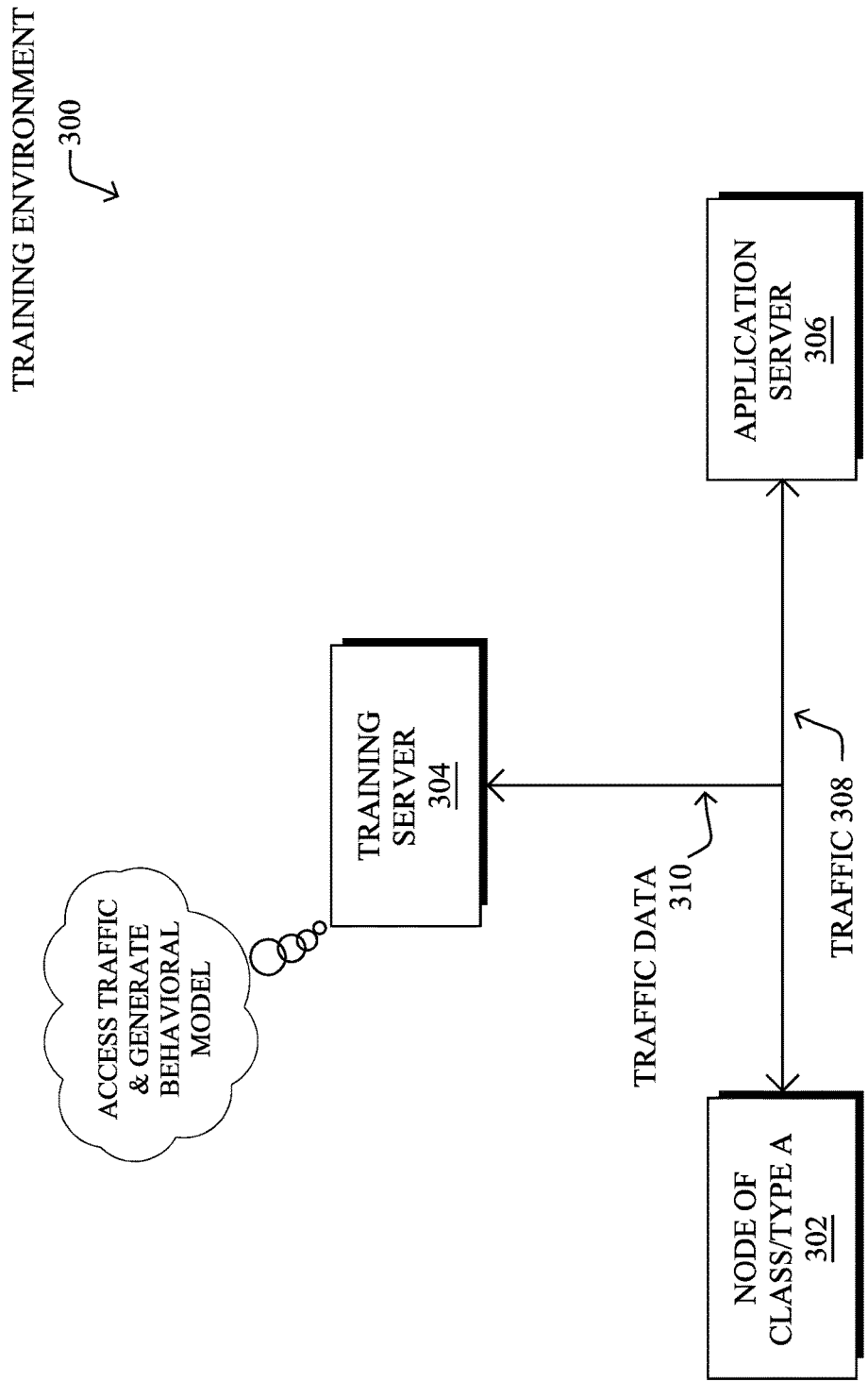
FIG. 3 illustrates an example of the training of a class behavioral model.

FIG. 3 illustrates an example of the training of a class behavioral model, according to various embodiments. In order to detect fraudulent nodes/devices, a training process must first take place, to understand the characteristics of legitimate traffic for that device class. This training does not require any traffic other than the legitimate traffic for the device class. As shown, training environment 300 may include a node 302 of a known class/type 'A.' For example, assume for purposes of illustration that node 302 is an 'Acme Luminaire Manufacturer Model 10.' Training environment 300 may also include a training server 304 that receives monitored traffic 308 exchanged between node 302 and one or more application servers 306 during use of node 302. In other words, a legitimate 'Acme Luminaire Manufacturer Model 10' may be allowed to communicate with those server(s) 306 with which it would communicate during normal operation in a network deployment.

Captured traffic data 310 regarding traffic 308 is sent to training server 304, which uses this data to understand what legitimate traffic looks like for nodes of class/type 'A.' In particular, in various embodiments, training server 304 may assess the traffic data and build a machine learning-based behavioral model for the class of node 302. Example traffic characteristics that can be used to construct the model may include, but are not limited to, the sizes of the session packets, the frequency of the session packets, device or application-specific features such as the use of any common or proprietary protocols, combinations thereof, and the like.

More specifically, training server 304 may assess any or all of the information available from captured traffic data 310 which may include, e.g., actual captured packets from traffic 308, Netflow and/or IPFIX records, Joy package output data, captured header information from traffic 308 such as Transport Layer Security (TLS) metadata, Hypertext Transfer Protocol (HTTP) header information, Domain Name System (DNS) request information, packet length and time information regarding traffic 308, or the like. In other words, any or all of the information regarding the observed traffic 308 for node 302 may be used by training server 304 to model the network behavior of node 302.

It can be noted that the claim of device class (e.g., from a MUD URI or other indicia of an asserted class) can be resolved to obtain access policy for the device class. For example, an access policy obtained from a MUD URI asserted by node 302 may identify application server 306 as an authorized endpoint with which node 302 may communicate. In some cases, however, the access policy may also include further endpoints/services that are not found within the actual traffic for the node observed in the training environment. For example, assume that the access policy derived from the MUD URI asserted by node 302 includes several DNS names that node 302 could use as a server (e.g., east.foo.com and west.foo.com). During actual operation, node 302 may select one of these names (e.g., east.foo.com may resolve to the address of application server 306), leaving the other names unused and unobserved in training environment 300.

In some embodiments, training server 304 may also use "synthetic" training data, to generate the behavioral model for node 302. In general, synthetic training data comprises training data that was not actually observed in the training environment, but was instead formed to simulate the unobserved data points. For example, in the case of training environment 300, training server 304 may use synthetic traffic data to further train the behavioral model for device class 'A' on simulated traffic to the endpoints/services that are in the access policy for this class, but were unobserved in traffic 308. Notably, if west.foo.com was found in the access policy associated with device class 'A,' but traffic 308 does not include any traffic to this address, training server 304 may nonetheless generate the behavioral model for class 'A' to also encompass traffic to this address.

When training is complete, training server 304 may package the behavioral model as a training module for the device class of node 302. Such a module may be configured for installation and execution by a networking device in a network, to determine whether a node in the network that claims the class of node 302 behaves in a similar manner. Notably, even if the node in the network only communicates with authorized endpoints/services, such as application server 306, its traffic may still differ considerably from that of traffic 308, which is a strong indication that the node in the network fraudulently asserted the device class of node 302 to the network.

Figure 4:
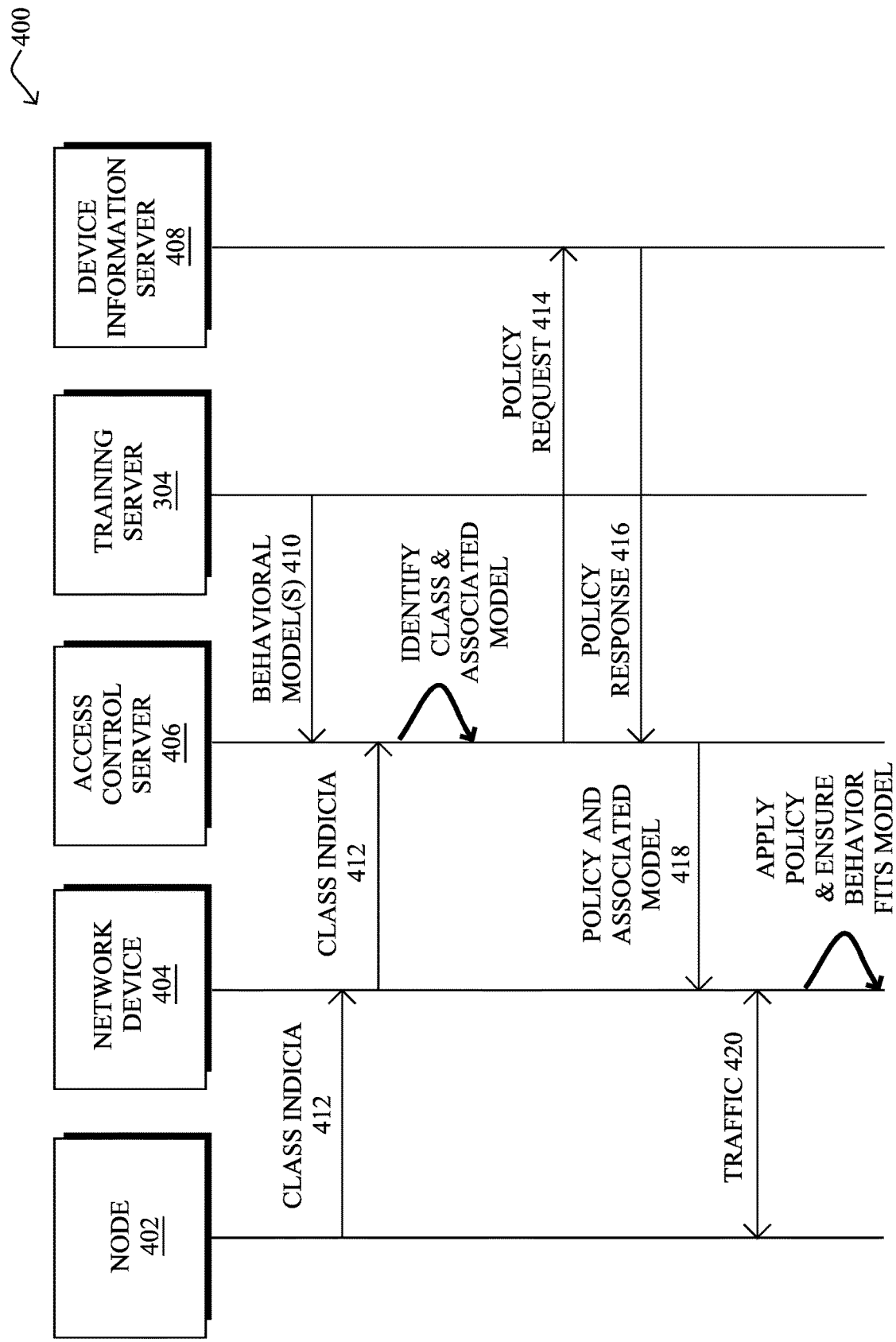
FIG. 4 illustrates an example of the validation of a class claim.

FIG. 4 illustrates an example of the validation of a class claim, according to various embodiments. In one potential implementation 400 of the techniques herein, consider the case in which a node 402 attempts to join a network that comprises a networking device 404, such as a router, switch, gateway, other edge device, or the like. The network may also include an access control server 406 that provides supervisory control over networking device 404. For example, access control server 406 may promulgate access policies to networking device 404 and potentially other networking devices, as well, thereby restricting the endpoints/services that a given node is allowed to access via the network. Mechanisms that may be hosted by access control server 404 may include, for example, a MUD controller, an Identity Services Engine (ISE) by Cisco System, Inc., a Digital Network Architecture (DNA) controller by Cisco Systems, Inc. or other mechanisms that perform similar functions.

At some point in time, training server 304, discussed previously, may download any number of behavioral models 410 to access control server 406 as training modules. Behavioral models 410 may be trained to describe the network behaviors of any number of different device types/classes that may be seen in the network. As would be appreciated, training server 304 may be operated by a trusted entity, such as the manufacturer or vendor of the device class(es), a network security-focused entity, or the like. Installation of behavioral model(s) 410 may also entail the use of any number of authentication and encryption mechanisms between access control server 406 and training server 304, to prevent a malicious entity from installing behavioral model(s) 410 to access control server 406. Behavioral model(s) 410 may be installed at any time, such as during initial network deployment, at a scheduled time, or even on demand, such as when a new device class is asserted by a node joining the network serviced by access control server 406.

When node 402 joins the network of network device 404, it may send class indicia 412 to networking device 404 indicative of the device class asserted by node 402. For example, indicia 412 may comprise a MUD URI, a serial or model number, or other indication of the type/class of node 402. In response to receiving the class indicia 412, networking device 404 may forward indicia 412 to access control server 406 for evaluation.

Based on the received class indicia 412, access control server 406 may identify the class asserted by node 402 and the training module/behavioral model associated with the class. In addition, access control server 412 may identify an access policy for the asserted class, as well. For example, if an explicit class claim was made by node 402 (e.g., via class indicia 412), such as via a MUD URI, access control server 406 may retrieve the access policy for the class either locally or by sending a policy request 414 to the device information server 408 associated with the MUD URI, to download the access data associated with the asserted class. In turn, device information server 408 may send policy response 416 to access control server 406 with the information needed by access control server 406 to implement an appropriate access policy in the network (e.g., response 416 may indicate the endpoints/services with which that the devices of the asserted class may communicate).

After identifying the appropriate behavioral model and access policy for the class asserted by node 402, access control server 406 may cause the identified model and policy to be installed on network device 404 and potentially any number of other network devices in the network, as well. For example, as shown, access control server 406 may send the identified access policy and class behavioral model 418 to network device 404. In other embodiments, access control server 406 may instruct one or more other devices in the network to install the policy and class behavioral model to network device 404 (e.g., a local cache service, a network peer of network device 404, etc.).

Once the access policy and class behavioral model are installed to network device 404, network device 404 may apply the policy and model to traffic 420 associated with node 402 (e.g., traffic sent by node 402 and/or destined for node 402). For example, network device 404 may use the access policy to control the set of endpoints/services with which node 402 is authorized to communicate. In addition, network device 404 may continue to assess whether the behavior of node 402, as indicated by traffic 420, deviates from the behavioral model for the class asserted by node 402. For example, node 402 may attempt to access a number of endpoints/services that are outside of the allowed endpoints/services of the access policy for its device class. In another example, even if traffic 420 is exchanged with an authorized endpoint, the characteristics of traffic 420 may differ significantly from that used in the training data for the class behavioral model. In either case, this may be an indication that node 402 is not of the asserted class.

When network device 404 determines that the behavior of node 402 deviates from its class behavioral model (e.g., that the class asserted by node 402 is not its actual class), network device 404 may cause any number of mitigation actions to be performed. In some cases, network device 404 may generate and send an alert, such as to a user interface for review by a network administrator and/or to other networking devices. In further cases, network device 404 may begin blocking or otherwise quarantining traffic 420, when node 402 begins deviating from its expected behavior for its asserted device class.

Figure 5:
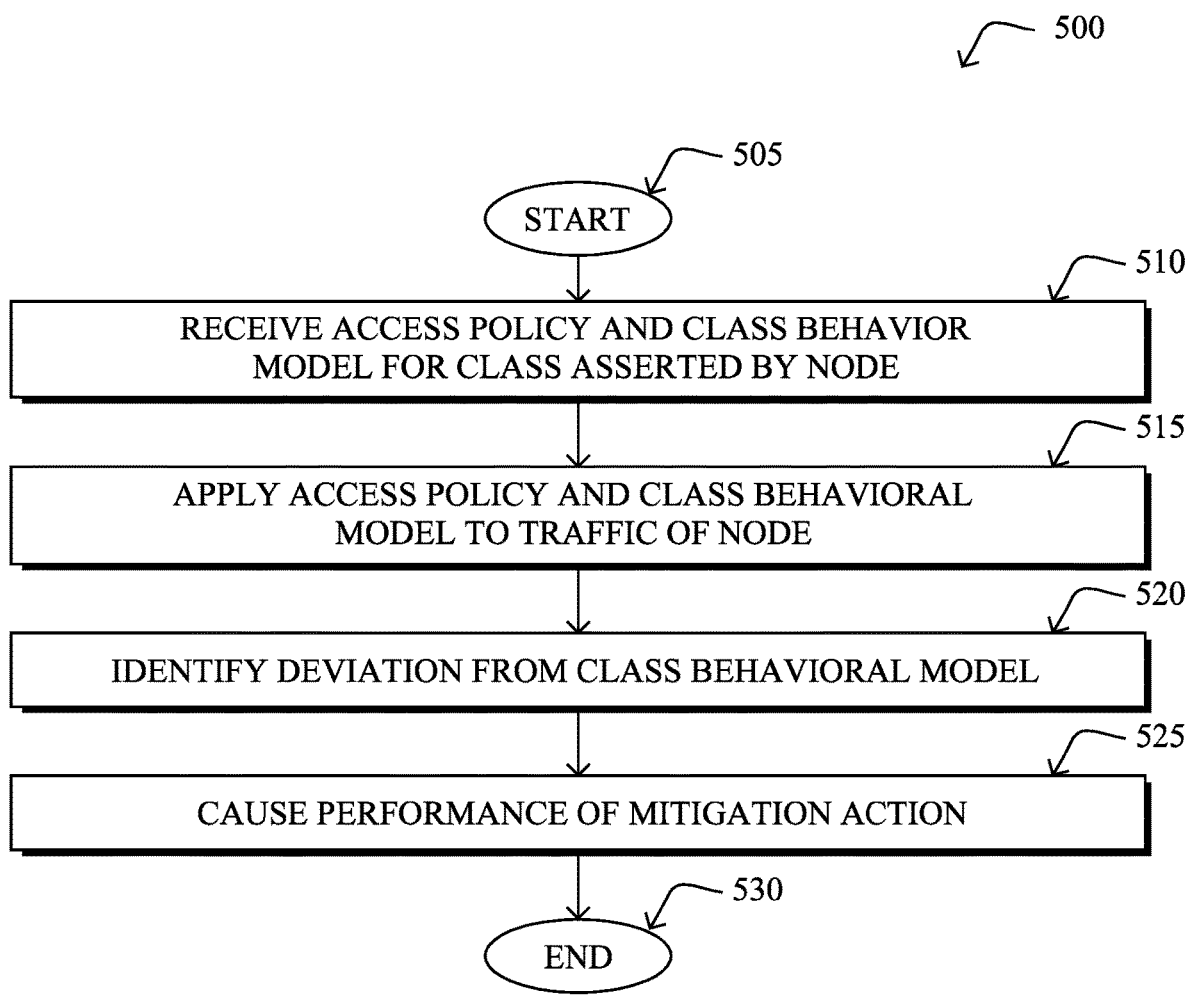
FIG. 5 illustrates an example simplified procedure for validating a class claim.

FIG. 5 illustrates an example simplified procedure for validating a class claim in a network in accordance with one or more embodiments described herein. For example, a non-generic, specifically configured device (e.g., device 200) may perform procedure 500 by executing stored instructions (e.g., process 248). In various cases, procedure 500 may be performed by a networking device, such as a router, switch, firewall, gateway, other edge device, or the like. The procedure 500 may start at step 505, and continues to step 510, where, as described in greater detail above, the device may receive an access policy and class behavioral model from a supervisory device of the networking device. For example, the device may receive the access policy and class behavioral model from an access control server and/or other combinations of supervisory devices. Both the access policy and class behavioral model may be selected by the supervisory device based on a class asserted by a node in the network.

At step 515, as detailed above, the device may apply the access policy and class behavioral model to the traffic associated with the node. For example, the device may restrict the access of the node to and/or from certain endpoints or services. Further, by applying the class behavioral model to the traffic, the device can identify behavioral deviations from the class behavioral model, which models the typical traffic/behavior expected of a node having the class asserted by the node in the network.

At step 520, the device may identify a deviation of the behavior of the node from the class behavioral model, as described in greater detail above. Notably, based on the application of the class behavioral model to the traffic associated with the node, the device may identify cases in which the characteristics of the traffic associated with the node do not fall within the class model. For example, if the traffic associated with the node uses different packet sizes, protocols, TLS metadata, or other characteristics than those expected by the class behavioral model, the device may determine that the behavior of the node has deviated from the model. Such a deviation is a strong indicator that either the class asserted by the node was incorrect and, potentially, misrepresented for malicious reason.

At step 525, as detailed above, the device may cause the performance of one or more mitigation actions, based on the identified deviation of the behavior of the node from that of the class behavioral model. For example, the device itself, or in conjunction with one or more other networking devices, may cause the traffic associated with the node to be quarantined, blocked, and/or flagged for additional scrutiny (e.g., using deep packet inspection or other heightened scrutiny). In another example, the device may generate an alert and send the alert to another device or user interface, thereby requesting additional review or corrective measures to be taken. Procedure 500 then ends at step 530.

Figure 6:
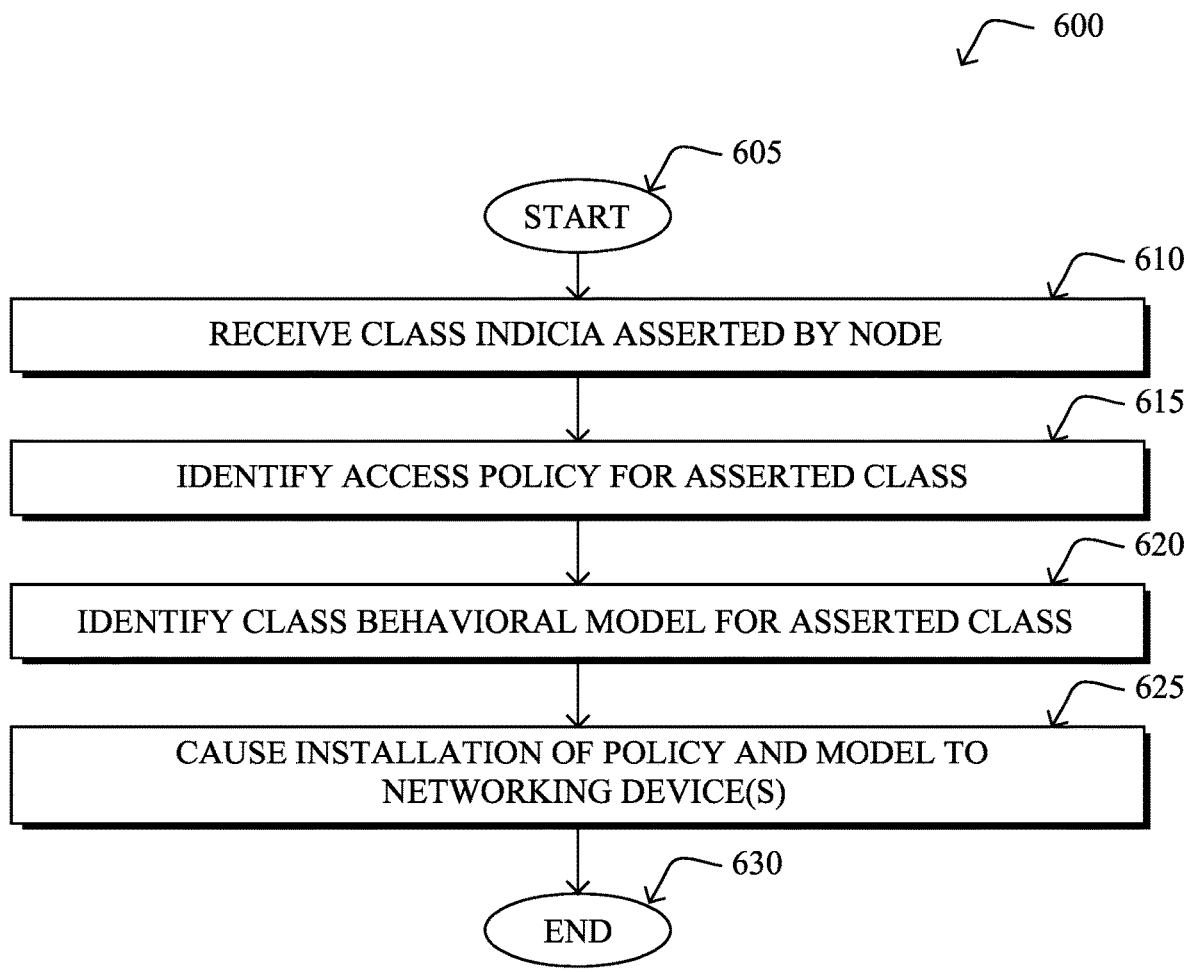
FIG. 6 illustrates an example simplified procedure for installing an access policy and class behavioral model to a networking device.

FIG. 6 illustrates an example simplified procedure for validating a class claim in a network in accordance with one or more embodiments described herein. For example, a non-generic, specifically configured device (e.g., device 200) may perform procedure 600 by executing stored instructions (e.g., process 248). Notably, procedure 600 may be performed by a supervisory device in an network, such as an access control server, that provides supervisory control over any number of network/networking devices in the network. Procedure 600 may start at step 605 and continues on to step 610 where, as described in greater detail above, the supervisory device may receive data indicative of a device type/class asserted by a node in the network. For example, the node may explicitly or implicitly assert a particular type/class to which the node belongs (e.g., by sending a MUD URI, by claiming a particular make or model, etc.).

At step 615, as detailed above, the supervisory device may identify an access policy for the class asserted by the node. In general, such an access policy may list the endpoints/service that the node can and/or cannot access via the network. For example, if the node asserted a MUD URI, the supervisory device may download data from the URI and use it to form an access policy that whitelists communications between the node and an application server associated with the asserted class/type.

At step 620, the supervisory device may identify a class behavioral model for the asserted class, as described in greater detail above. In various embodiments, the class behavioral model may be a machine learning-based traffic model that is trained using traffic data observed from one or more devices of the class asserted by the node. In further embodiments, the traffic model may also be trained using synthetic training data, such as based on the data in the access policy. For example, the synthetic training data may also simulate traffic data for traffic to other endpoints/services to which the device class may communicate, but such traffic was not observed during operation in the training environment (e.g., alternate application servers, etc.).

At step 625, as detailed above, the supervisory device may cause the installation of the access policy and class behavioral model to one or more networking devices in the network. For example, the supervisory device may send the policy and model directly to the networking device(s), instruct the networking device(s) to download the policy and/or model from another source, or coordinate the installation with further networking devices in the network. In turn, the networking device(s) receiving the policy and model may apply the policy and model to traffic associated with the node that asserted the device class. Further, if the application of the class behavioral model by the networking device to the traffic of the node indicates a behavioral deviation, the networking device may cause any number of mitigation actions to be performed in the network, as the class asserted by the node was likely incorrect and/or fraudulently asserted. Procedure 600 then ends at step 625.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, allow a network to apply different access policies to different classes of nodes that join the network. In addition, the techniques herein also provide for the verification of an asserted device class by a node, using a trained behavioral model for that device class/type.

While there have been shown and described illustrative embodiments that provide for validating an device class claim made by a node in a network, it is to be understood that various other adaptations and modifications may be made within the spirit and scope of the embodiments herein. For example, while certain embodiments are described herein with respect to using certain models for purposes of modeling node and traffic behavior, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a device in a network, an access policy and a class behavioral model for a node in the network that are selected based on a class asserted by the node, wherein the class behavioral model is a machine learning-based traffic model that is trained using:
      a) traffic data observed from one or more devices of the class asserted by the node that comprises legitimate traffic for the class asserted by the node, and
      b) synthetic traffic data comprising training data that was not observed in the traffic data and formed based on the access policy associated with the class asserted by the node;
    applying, by the device, the access policy and the class behavioral model to traffic associated with the node;
    identifying, by the device, a deviation in a behavior of the node from the class behavioral model, based on the application of the class behavioral model to the traffic associated with the node; and
    causing, by the device, performance of a mitigation action in the network based on the identified deviation in the behavior of the node from the class behavioral model.

2. The method as in claim 1, wherein the mitigation action comprises one of: blocking at least a portion of the traffic associated with the node or generating an alert regarding the node.

3. The method as in claim 1, wherein the access policy indicates a set of one or more endpoints with which the node is authorized to communicate.

4. The method as in claim 1, wherein the device comprises at least one of: a router, a switch, a firewall, or a gateway in the network.

5. The method as in claim 1, wherein the class asserted by the node is associated with a Manufacturer Usage Description (MUD) Universal Resource Identifier (URI) asserted by the node.

6. The method as in claim 5, wherein the access policy is determined using data downloaded from the MUD URI.

7. A method comprising:
    receiving, at a supervisory device in a network, data indicative of a class asserted by a node in the network;
    identifying, by the supervisory device, an access policy associated with the class asserted by the node;
    selecting, by the supervisory device, a class behavioral model associated with the class asserted by the node, wherein the class behavioral model is a machine learning-based traffic model that is trained using:
      a) traffic data observed from one or more devices of the class asserted by the node that comprises legitimate traffic for the class asserted by the node, and
      b) synthetic traffic data comprising training data that was not observed in the traffic data and formed based on the access policy associated with the class asserted by the node; and
    causing, by the supervisory device, installation of the access policy and the class behavioral model to one or more networking devices in the network, wherein the one or more networking devices apply the access policy and the class behavioral model to traffic associated with the node, and wherein the one or more networking devices cause a mitigation action to be performed when a behavior of the node deviates from the class behavioral model.

8. The method as in claim 7, wherein the supervisory device is an access control server, and wherein the device comprises at least one of: a router, a switch, a firewall, or a gateway in the network.

9. The method as in claim 7, wherein the data indicative of the class asserted by the node comprises a Manufacturer Usage Description (MUD) Universal Resource Identifier (URI) asserted by the node.

10. The method as in claim 9, further comprising:
downloading, by the supervisory device, data from the MUD URI to determine the access policy.

11. An apparatus, comprising:
one or more network interfaces to communicate with a network;
a processor coupled to the network interfaces and configured to execute one or more processes; and
a memory configured to store a process executable by the processor, the process when executed configured to:
receive an access policy and a class behavioral model for a node in the network that are selected based on a class asserted by the node, wherein the class behavioral model is a machine learning-based traffic model that is trained using:
a) traffic data observed from one or more devices of the class asserted by the node that comprises legitimate traffic for the class asserted by the node, and
b) synthetic traffic data comprising training data that was not observed in the traffic data and formed based on the access policy associated with the class asserted by the node; and
apply the access policy and the class behavioral model to traffic associated with the node;
identify a deviation in a behavior of the node from the class behavioral model, based on the application of the class behavioral model to the traffic associated with the node; and
cause performance of a mitigation action in the network based on the identified deviation in the behavior of the node from the class behavioral model.

12. The apparatus as in claim 11, wherein the mitigation action comprises one of: blocking at least a portion of the traffic associated with the node or generating an alert regarding the node.

13. The apparatus as in claim 11, wherein the access policy indicates a set of one or more endpoints with which the node is authorized to communicate.

14. The apparatus as in claim 11, wherein the device comprises at least one of: a router, a switch, a firewall, or a gateway in the network.

15. The apparatus as in claim 11, wherein the class asserted by the node is associated with a Manufacturer Usage Description (MUD) Universal Resource Identifier (URI) asserted by the node.

16. The method as in claim 7, wherein the mitigation action comprises one of: blocking at least a portion of the traffic associated with the node or generating an alert regarding the node.

17. The method as in claim 7, wherein the access policy indicates a set of one or more endpoints with which the node is authorized to communicate.

18. The apparatus as in claim 15, wherein the access policy is determined using data downloaded from the MUD URI.

* * * * *